United States Patent
Berger et al.

(10) Patent No.: US 11,337,043 B2
(45) Date of Patent: May 17, 2022

(54) UNIVERSAL PACKET SIGNALING MESSAGING SYSTEM

(71) Applicant: Deutsche Telekom AG, Bonn (DE)

(72) Inventors: Karl Berger, Vienna (AT); Reinhardt Lauster, St. Poelten (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/279,652

(22) PCT Filed: Sep. 27, 2019

(86) PCT No.: PCT/EP2019/076180
§ 371 (c)(1),
(2) Date: Mar. 25, 2021

(87) PCT Pub. No.: WO2020/065007
PCT Pub. Date: Apr. 2, 2020

(65) Prior Publication Data
US 2021/0392476 A1    Dec. 16, 2021

(30) Foreign Application Priority Data

Sep. 28, 2018   (EP) .................................... 18197592

(51) Int. Cl.
*H04W 4/14* (2009.01)
*H04W 12/72* (2021.01)
(Continued)

(52) U.S. Cl.
CPC ............. *H04W 4/14* (2013.01); *H04L 67/141* (2013.01); *H04W 12/06* (2013.01); *H04W 12/72* (2021.01); *H04W 92/02* (2013.01)

(58) Field of Classification Search
CPC combination set(s) only.
See application file for complete search history.

(56) References Cited

U.S. PATENT DOCUMENTS

| 2008/0076392 A1* | 3/2008 | Khetawat | .............. | H04L 63/123 455/411 |
| 2009/0028115 A1* | 1/2009 | Hirsch | .................. | H04B 1/005 370/337 |

(Continued)

FOREIGN PATENT DOCUMENTS

WO    WO 2012164551 A2    12/2012

OTHER PUBLICATIONS

"3rd Generation Partnership Project; Technical Specification Group Services and System Aspects; Support of Short Message Service (SMS) over generic 3GPP Internet Protocol (IP) access; Stage 2 (Release 15)", 3GPP TS 23.204 V15.0.0, Mar. 2018, pp. 1-59, 3GPP, Sophia Antipolis, France.

*Primary Examiner* — Robert C Scheibel
*Assistant Examiner* — Hicham B Foud
(74) *Attorney, Agent, or Firm* — Leydig, Voit & Mayer, Ltd.

(57) ABSTRACT

A Universal Packet Signaling Messaging System (UPSMS) system extends a message received from a messaging system based on a message signaling protocol extension that extends the message signaling protocol by including an indication that the UPSMS service is supported for a respective subscriber, and forwards the extended message to a subscription and location server. The subscription and location server authenticates a subscriber based on the subscriber identity, identifies a packet core network, and delivers the extended message via the identified packet core network to a user equipment (UE).

15 Claims, 8 Drawing Sheets

(51) Int. Cl.
*H04L 67/141* (2022.01)
*H04W 12/06* (2021.01)
*H04W 92/02* (2009.01)

(56) References Cited

U.S. PATENT DOCUMENTS

2009/0318174 A1   12/2009  Tarleton et al.
2014/0155112 A1*   6/2014  Molnar ............... H04L 65/1006
                                                     455/466
2017/0339538 A1   11/2017  Yang et al.
2020/0322794 A1*  10/2020  Baltatu ................. H04W 12/04

* cited by examiner

ID
UNIVERSAL PACKET SIGNALING MESSAGING SYSTEM

CROSS-REFERENCE TO PRIOR APPLICATIONS

This application is a U.S. National Phase Application under 35 U.S.C. § 371 of International Application No. PCT/EP2019/076180, filed on Sep. 27, 2019, and claims benefit to European Patent Application No. EP 18197592.1, filed on Sep. 28, 2018. The International Application was published in English on Apr. 2, 2020 as WO 2020/065007 A1 under PCT Article 21(2).

FIELD

The invention relates to communication techniques based on Universal Packet Signaling Messaging System (UPSMS) for delivery of messages over packet signaling networks and an associated subscription and location server.

BACKGROUND

For SMS (short message service) or message delivery over a packet core network an additional core network layer is required today. A mobile switching center (MSC) or IP multimedia subsystem (IMS) core platform (i.e. SMS over IP via IMS service) and the related registration of the UE with additional signaling is needed. To enable a seamless service interworking over different packet core network evolutions a complex combination of registration and interworking is needed. By phase out of older network elements (e.g. 2G/3G) or not congruent radio coverage rollouts, the service reachability or availability is decreasing. On the other hand, operators, manufactures, regulator or government organizations currently have no standardized method to exchange information (e.g. small messages) with user equipments (UEs) in a packet core and access network independent way.

SUMMARY

In an exemplary embodiment, the present invention provides a communication system. The communication system includes: a plurality of messaging systems for delivering messages based on a respective message signaling protocol; a plurality of packet core networks, wherein each packet core network corresponds to a respective packet core network technology; a subscription and location server configured to store for each subscriber of a plurality of subscribers associated with a corresponding user equipment (UE): a subscriber identity; a subscriber location indicating in which packet core network of the plurality of packet core networks the subscriber is located; and an indication that a Universal Packet Signaling Messaging System (UPSMS) service is supported; and a UPSMS system configured to extend a message received from one of the messaging systems based on a message signaling protocol extension that extends the message signaling protocol by including an indication that the UPSMS service is supported for a respective subscriber, and to forward the extended message to the subscription and location server. The subscription and location server is configured to authenticate a subscriber based on the subscriber identity, and to identify for an authenticated subscriber, for whom the UPSMS service is supported, a packet core network of the plurality of packet core networks that is connected to the corresponding UE, based on the subscriber identity, and to deliver the extended message via the identified packet core network to the corresponding UE.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
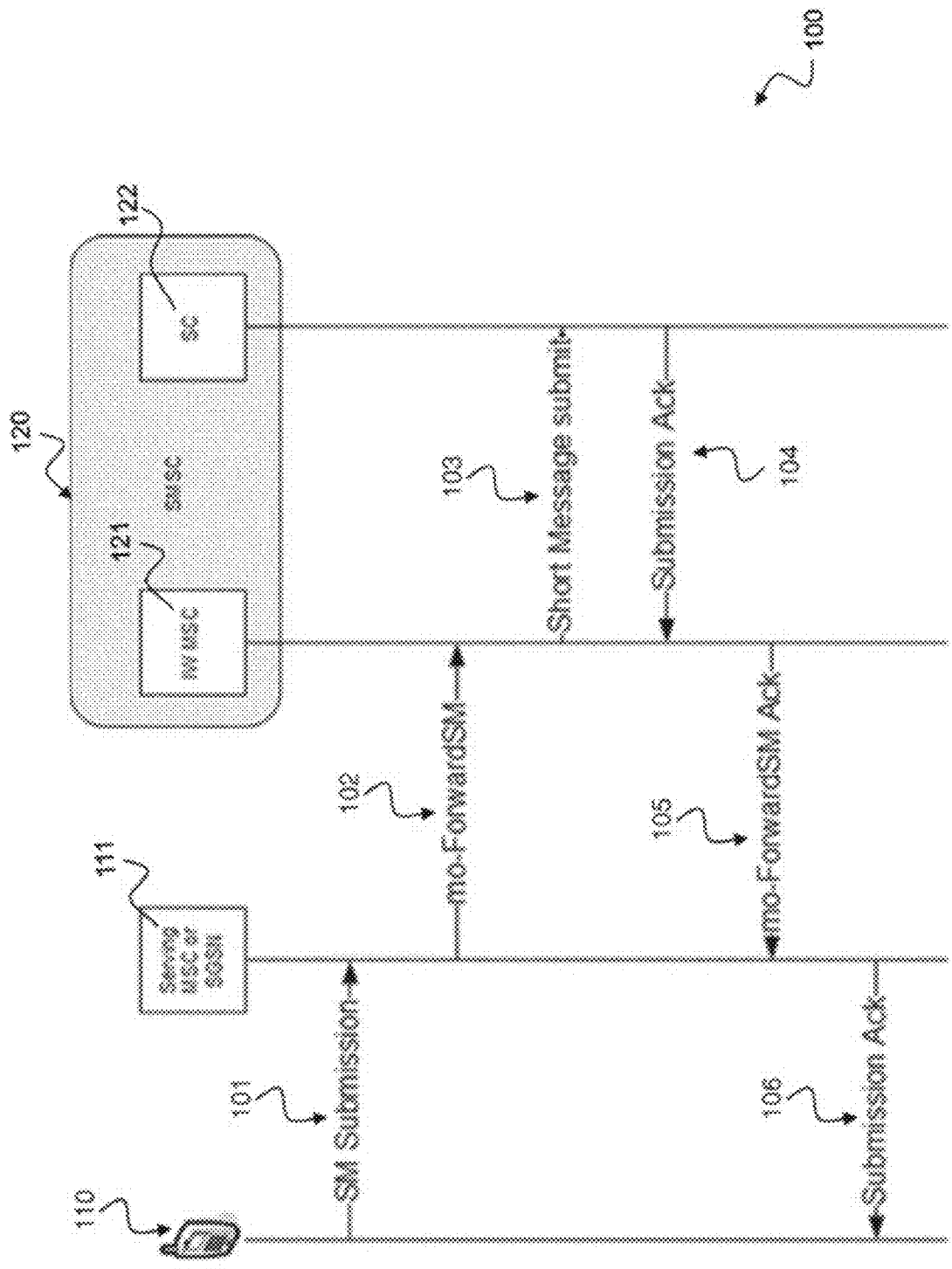
FIG. 1 shows a message sequence diagram 100 illustrating a common mobile-originated (MO) Short Message Service (SMS)

Exemplary embodiments of the present invention improve the message delivery independent of the packet core network and independent from the access network and its evolutions.

Exemplary embodiments of the present invention provide a signaling mechanism and a UPSMS network element, which delivers any kind of messages via control plane signaling, using unified protocol extensions (e.g. Diameter and NAS message extensions), to a UE connected via an access network to a packet core network (e.g. 5G and beyond, non 3GPP packet core networks). This enables a simple cost-efficient network deployment with no need to deploy legacy network function independent of the core network evolution (e.g. 5G and beyond). Additionally, for roaming and interconnection scenarios, a major simplification and cost-efficient deployment with such a unified packet-based message delivery can be achieved.

The Universal Packet Switched Message System (UP-SMS) can use any packet access and/or core network where a subscriber can register via HSS (home subscription server) and/or other register databases. In such a network, a subscribed UE (user equipment) can receive and deliver small messages (e.g. SMS, IP based messaging, unstructured data, OTA (over-the-air) messages, public warning messages (PWS) with standardized packet core technology native paging and signaling capabilities and optionally via a secure transfer over the signaling layer (e.g. SMS, IP based messaging, unstructured messages, OTA messages). The system supports optimal message receive and message delivery including the message content via unified interfaces (e.g. DIAMETER protocol extensions or Service Based Interface extensions) between UPSMS and HSS/HLR and packet core network elements (e.g. MME, AMF, etc.). The UPSMS supports interworking with legacy (e.g. SMS SC) and interworking with new messaging services (using application layer communication) as a gateway function with standard interfaces.

The methods and systems presented below may be of various types. The individual elements described may be realized by hardware or software components, for example electronic components that can be manufactured by various technologies and include, for example, semiconductor chips, application-specific integrated circuits (ASICs), microprocessors, digital signal processors, integrated electrical circuits, electro-optical circuits and/or passive components.

The devices, systems and methods presented below are capable of transmitting information over a communication network. The term communication network or communication system refers to the technical infrastructure on which the transmission of signals takes place. The communication network comprises the switching network in which the transmission and switching of the signals takes place between the stationary devices and platforms of the mobile radio network or fixed network, and the access network in which the transmission of the signals takes place between a network access device and the communication terminal. The communication network can comprise both components of a mobile radio network as well as components of a fixed network. In the mobile network, the access network is also referred to as an air interface and includes, for example, a base station (NodeB, eNodeB, radio cell) with mobile antenna to establish the communication to a communication terminal or user equipment as described above, for example, a mobile phone or a mobile device with mobile adapter or a machine terminal.

According to a first aspect the invention relates to a communication system, comprising: a plurality of messaging systems for delivering messages based on a respective message signaling protocol; a plurality of packet core networks, wherein each packet core network is designed according to a respective packet core network technology; a subscription and location server, configured to store for each subscriber of a plurality of subscribers associated with a corresponding user equipment (UE): a subscriber identity; a subscriber location indicating in which packet core network of the plurality of packet core networks the subscriber is located; and an indication that a Universal Packet Signaling Messaging System (UPSMS) service is supported; and a UPSMS system, configured to extend a message received from one of the messaging systems based on a message signaling protocol extension that extends the message signaling protocol by including an indication that UPSMS is supported, and to forward the extended message to the subscription and location server, wherein the subscription and location server is configured to authenticate a subscriber based on the subscriber identity, and to identify for an authenticated subscriber, for whom the UPSMS service is supported, a packet core network of the plurality of packet core networks that is connected to the corresponding UE, based on the subscriber identity, and to deliver the extended message via the identified packet core network to the corresponding UE.

Such a communication system with UPSMS allows operators to deliver secure and much more efficient all kind of small messages (e.g. SMS, IP based messaging, unstructured messages, OTA, public warning messages), using unified protocol extensions (e.g. Diameter extensions or Service Based Interface extensions), to a UE connected to a packet core network (e.g. 4G, 5G, WLAN). The message transfer is agnostic to the access network and its evolution. The communication system provides support of any kind of messages like OTA (Device configuration messages), unstructured messages (e.g. USSD), BLOB (Binary large objects), SMS, etc. There is no need to deploy specific adaptations, e.g. for SMS delivery and sending the legacy nodes like e.g. GMSC or for new generation networks and the IMS core network to enable the required SMS routing. The new unified signaling (e.g. Diameter extensions or Service Based Interface extensions) can support secure connection between an UE and/or between the packet core network elements (e.g. MME, HSS, AMF). Hence, such a communication system simplifies the design of the overall communication network.

In an exemplary implementation form of the communication system, the message signaling protocol extension is based on control plane signaling.

This provides the advantage that the control plane can be used to deliver the message. Initiation or usage of the data plane can be avoided, thereby simplifying the design of the network, i.e. the communication system.

In an exemplary implementation form of the communication system, the message signaling protocol extension is configured to add the indication that the UPSMS service is supported to the message received from one of the messaging systems and to encapsulate the message with the indication in the extended message, wherein a format of the extended message is unified for the plurality of messaging systems.

This provides the advantage that messages from different messaging systems can be treated in a same manner. By encapsulating the message with the indication in the extended message, the extended message has the same format for all messages resulting from different messaging systems.

In an exemplary implementation form of the communication system, the subscription and location server is configured to deliver the extended message via control plane to the corresponding UE.

This provides the advantage that the subscription and location server can be designed without a complex data plane protocol for delivering different kind of data. The subscription and location server only has to provide the respective signaling protocol stack for delivering the message via control plane. This simplifies the design of the subscription and location server.

Separate message transfer via control plane to the UE avoids payload traffic for messaging. This enables message transfer in scenarios for UEs with signaling only packet core network attach/access. A further advantage is that the routing logic is independent from network/messaging platform and only uses the packet core network native routing and paging functions. This enables also interconnection for messaging services between operators with different network protocols/technologies in place e.g. SS7 and Diameter.

In an exemplary implementation form of the communication system, the message signaling protocol extension is based on a Diameter signaling protocol or a service-based interface.

This provides the advantage that existing implementations of messaging systems that are based on the Diameter signaling or a service-based interface (e.g. SIP) can be reused with the UPSMS feature because the message signaling protocol extension is based on the Diameter signaling protocol or a service-based protocol, e.g. SIP.

In an exemplary implementation form of the communication system, the subscription and location server is configured to deliver the message via one of the following packet core networks to the UE: 2G/3G packet core network using SGSN, 4G packet core network using MME, 5G packet core network using AMF, trusted mobile or fixed packet core network, untrusted mobile or fixed packet core network, WLAN packet core network using a packet core network specific control element such as an AAA.

This provides the advantage that the communication system can interwork with a plurality of different packet core networks connecting the UE. When a new packet core network is developed, there is no need to change the design of the communication system.

In an exemplary implementation form of the communication system, the subscription and location server is a home subscription and location server of a roaming user of the UE.

This provides the advantage that the UPSMS can be applied for roaming scenarios.

In an exemplary implementation form of the communication system, the UPSMS system is configured to provide firewall functionality to block a message based on a transport protocol of the message and an application protocol of the message.

This provides the advantage that security of communication can be improved.

In an exemplary implementation form of the communication system, the subscription and location server is configured to determine a location of the UE based on a paging functionality of the plurality of packet core networks, in particular based on a paging functionality of the packet core network of the plurality of packet core networks that is connected to the UE.

This provides the advantage that the packet core network native paging functions can be efficiently exploited to determine the location of the UE.

In an exemplary implementation form of the communication system, the message content is amongst others e.g. one of the following message types: SMS, IP-based packet, unstructured data message, Over-the-Air (OTA) message e.g. for UE configuration purpose, public warning message (PWS).

This provides the advantage that the communication system can be used with different kind of messages, in particular short signaling messages.

In an exemplary implementation form of the communication system, the UPSMS system is configured to: receive a message comprising a UE identifier of the UE; determine the subscription and location server associated with the UE based on the UE identifier; transmit a request to the subscription and location server requesting for an indication if UPSMS is supported for the UE, wherein the request message comprises the UE identifier; and forward the message to the subscription and location server responsive to an indication that UPSMS is supported for the UE.

This provides the advantage that the UPSMS can efficiently determine the subscription and location server based on the UE identifier included in the message. The UPSMS can efficiently retrieve from the server if UPSMS is supported for that UE.

In an exemplary implementation form of the communication system, the subscription and location server is configured to: receive, from the UPSMS system (as provisioned to the subscription of the user), a request requesting for an indication if UPSMS is supported for the UE, wherein the request comprises a UE identifier of the UE; determine, based on the UE identifier, a subscription entry associated with the UE; retrieve, from the subscription entry, an indication indicating if UPSMS is supported for the UE and a packet core network identifier of the packet core network of the plurality of packet core networks that is connected to the UE; transmit, to the UPSMS system, a response to the request, the response comprising the retrieved indication; and forward the extended message from the UPSMS system to the packet core network corresponding to the retrieved packet core network identifier.

This provides the advantage that the subscription and location server can efficiently determine if UPSMS is supported for a UE based on its UE identifier.

In an exemplary implementation form of the communication system, each of the packet core networks comprises a packet core network entity that is configured to: receive, from the UE, a registration request comprising a UE identifier of the UE and a request for a UPSMS subscription; register the UE for access to the corresponding packet core network based on the UE identifier and for a support of UPSMS; and transmit a registration message to the subscription and location server associated with the UE, wherein the registration message comprises the UE identifier of the UE and an indication that UPSMS is supported for the UE.

This provides the advantage that registration for the UPSMS service can be efficiently performed by a respective packet core network.

In an exemplary implementation form of the communication system, the communication system comprises the UE, wherein the UE is configured to: transmit a registration request comprising the UE identifier of the UE and a request for a UPSMS subscription to the packet core network of the plurality of packet core networks that is connected to the UE; and transmit a message to the corresponding packet core network.

This provides the advantage that the UE can efficiently deal with the subscription to the UPSMS service.

According to a second aspect, the invention relates to a method for transmitting a message in a communication system comprising a plurality of messaging systems for delivering messages based on a respective message signaling protocol; a plurality of packet core networks, wherein each packet core network is designed according to a respective packet core network technology; a subscription and location server for storing for each subscriber of a plurality of subscribers associated with a corresponding user equipment (UE): a subscriber identity; a subscriber location indicating in which packet core network of the plurality of packet core networks the subscriber is located; and an indication that a Universal Packet Signaling Messaging System (UPSMS) service is supported; and a Universal Packet Signaling Messaging System (UPSMS), the method comprising: extending, by the UPSMS system, a message received from one of the messaging systems based on a message signaling protocol extension which extends the message signaling protocol by including an indication that UPSMS is supported; forwarding, by the UPSMS system, the extended message to the subscription and location server; identifying, by the subscription and location server, for an authenticated subscriber, for whom the UPSMS service is supported, a packet core network of the plurality of packet core networks that is connected to the corresponding UE, based on the subscriber identity; and delivering, by the subscription and location server, the extended message via the identified packet core network to the corresponding UE.

Such a method using UPSMS allows operators to deliver secure and much more efficient all kind of small messages (e.g. SMS, IP based messaging, unstructured messages, OTA, public warning messages), using unified protocol extensions (e.g. Diameter extensions or Service Based Interface extensions), to a UE connected to a packet core network (e.g. 4G, 5G, WLAN). The message transfer is agnostic to the access network and its evolution. The method provides support of any kind of messages like OTA (Device configuration messages), unstructured messages (e.g. USSD), BLOB (Binary large objects), SMS, etc. There is no need to deploy specific adaptations, e.g. for SMS delivery and sending the legacy nodes like e.g. GMSC or for new generation networks and the IMS core network to enable the required SMS routing. The new unified signaling (e.g. Diameter extensions or Service Based Interface extensions) can support secure connection between an UE and/or between the packet core network elements (e.g. MME, HSS, AMF). Hence, by using such a method the design of the overall communication network can be simplified.

According to a third aspect the invention relates to a computer program product comprising program code for performing a method according to an exemplary embodiment of the invention, when executed on a computer or a processor.

Embodiments of the invention can be implemented in hardware and/or software.

In the following detailed description, reference is made to the accompanying drawings, which form part of the disclosure, and in which are shown, by way of illustration, exemplary aspects in which the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

In the following, network entities are described such as network access entities and core network entities. The network access entity enables access and mobility management in the communication network. Via the network access entity, communication terminals with their identity (UE ID) can register in the communication network and receive the permission to set up a communication connection. For example, in the 5G communication network, the network access entity may be an AMF (Access and Mobility Management Function) representing the access and mobility management function. This manages the access and mobility control. The AMF may also include network slice selection functionality. For wireless access, mobility management is not needed. The network access entity may be, for example, an MME (mobility management entity) in the 4G communication network. The MME is a network component of the LTE (Long Term Evolution) mobile radio standard, which performs the functions of paging to set up calls and generally communication links as well as signaling for control purposes. The MME forms the link between core network and access network. The MME manages the locations of all mobile communication terminals in the radio cells connected to it. In the LTE system, several cells are usually combined to form a tracking area. The management area of an MME can be divided into several tracking areas.

The radio access network (RAN) is part of a mobile telecommunication system. It implements a radio access technology (RAT). Conceptually, it resides between a device such as a mobile phone, a computer, or any remotely controlled machine and provides connection with its core network (CN). Depending on the standard, mobile phones and other wireless connected devices are varyingly known as user equipment (UE), terminal equipment, mobile station (MS), etc. RAN functionality is typically provided by a RAN entity, e.g. a silicon chip, residing in both the core network as well as the user equipment. Examples of radio access network types are GERAN, the GSM radio access network including EDGE packet radio services, UTRAN, the UMTS radio access network, E-UTRAN, the LTE radio access network and the 5G RAN. The RAN entity can for example include a base station, e.g. a NodeB or and eNodeB or a 5G capable radio cell.

The network access entity further provides the technical function of first establishing a security relationship with a previously unknown security device, in order to then be able to install security elements (keys) in the device itself and in the network application function (NAF) of the network access function. For example, the Diameter and Hypertext Transfer Protocol (http) protocols can be used. For example, SOAP may be used between BSF and NAF instead of diameter.

Involved in the maintenance of such a generic security relationship are the following functional elements: terminal, e.g. a mobile phone, i.e. user equipment (UE), which wants to use a particular service, application server that provides the service, e.g. for Mobile TV, VoLTE, VoIP, FTP data transfer, media streaming, Internet browsing, etc., Network Application Function (NAF), the network access entity itself, which establishes a security relationship between UE and NAF and a database of the home network, e.g. Home Subscriber Server (HSS) or unified data repository (UDR) of the (mobile) network provider, which manages the respective user-specific profiles of its terminal users.

The network access entity network access feature is consulted by the application server (NAF) after a terminal has requested service access from it. Since the application server does not yet know the terminal at this time, it first refers this to the network access function. The terminal and the network access function now authenticate to each other; this can be done, for example, via the AKA protocol (Authentication and Key Agreement) and by inquiring the network access function to the Home Subscriber Server (HSS) or the UDR database of the home network. Subsequently, the network access function and the terminal (UE) agree on a session key to be used for encrypted data exchange with the application server (NAF). If the terminal now again turns to the application server, it can obtain both the session key and subscriber-specific data from the network access function and start the data exchange with the terminal (UE). The appropriate session keys are used for cryptographic protection.

Figure 2:
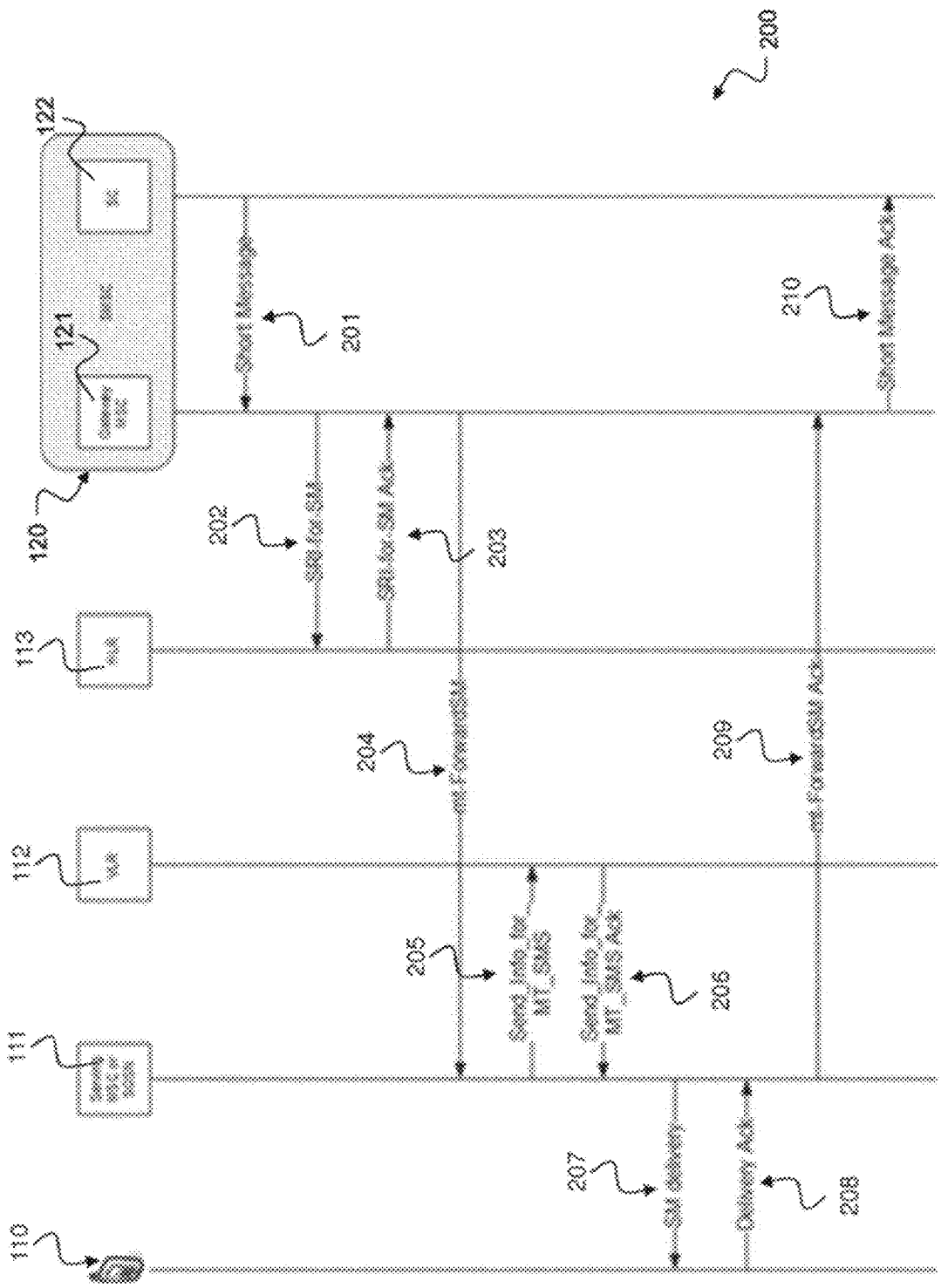
FIG. 2 shows a message sequence diagram 200 illustrating a common mobile terminated (MT) Short Message Service.

FIG. 1 shows a message sequence diagram 100 illustrating common mobile-originated (MO) Short Message Service (SMS) and FIG. 2 shows a message sequence diagram 200 illustrating common mobile terminated (MT) Short Message Service.

The Short Message Service is realized by use of the Mobile Application Part (MAP) of the SS7 protocol, with Short Message protocol elements being transported across the network as fields within the MAP messages. The Short Message protocol itself is defined by 3GPP TS 23.040 for the Short Message Service-Point to Point (SMS-PP), and 3GPP TS 23.041 for the Cell Broadcast Service (CBS). Four MAP procedures are defined for the control of the Short Message Service: Mobile Originated (MO) short message service transfer (as shown in FIG. 1); Mobile Terminated (MT) short message service transfer (as shown in FIG. 2); Short message alert procedure; Short message waiting data set procedure.

When the subscriber sends a Short Message, the handset 110 sends the text message over the air interface to the MSC/SGSN 111. Along with the actual text of the Short Message, the destination address of the SM and the address of the Short Message service center (SMSC) 120 are included, the latter taken from the handset's 110 configuration stored on the SIM card.

Regardless of the air interface technology, the VMSC/SGSN invokes the MAP service package MAP_MO_FORWARD_SHORT_MESSAGE to send the text to the Interworking MSC 121 of the Service Center 120 whose address was provided by the handset 110. This service sends the mo-ForwardSM 102 MAP operation to the SMSC 120 identified in the SM Submission from the handset 110, embedded within a Transaction Capabilities Application Part (TCAP) message, and transported over the core network using the Signaling Connection Control Part (SCCP).

The Interworking MSC 121 of the SMSC 120, on receipt of the MAP mo-ForwardSM message 102, passes the SMS-PP Application Protocol Data Unit (APDU) containing the text message 103 to the actual Service Center (SC) 122 of the SMSC 120 for storing, and subsequent "forwarding" (delivery) to the destination address and the SC 122 returns an acknowledgement 104 indicating success or failure. On receipt of this submission status from the Service Center 122, the Interworking MSC 121 will send an appropriate indication 105 back to the VMSC/SGSN 111 of the sending subscriber. The message submission status 106 is then forwarded, over the air interface, to the subscriber's handset 110.

When the SMSC 120 determines it needs to attempt to deliver a Short Message 201 to its destination, it will send the SMS-PP APDU containing the text message, the "B-Party" (destination phone number) and other details to the Gateway MSC (GMSC) 121 logical component on the SMSC 120. The GMSC 121, on receipt of this Short Message 201, needs to discover the location of the B-Party in order to be able to correctly deliver the text to the recipient (the term Gateway MSC, in this context, indicating an MSC that is obtaining routing information from the Home Location Register (HLR) 113). To do this, the GMSC 121 invokes the MAP service package MAP_SEND_ROUTING_INFO_FOR_SM, which sends a sendRoutingInfoForSM (SRI-for-SM 202) MAP message to the destination number's HLR 113, requesting their present location. This SRI-for-SM message 202 may be sent to an HLR 113 in the same network as the SMSC 120, or via an interconnect to an HLR 113 in a foreign PLMN, depending on which network the destination subscriber belongs to.

The HLR 113 performs a database lookup to retrieve the B-Party's current location, and returns it in an acknowledgement message 203 to the SMSC's GMSC entity 121. The current location may be the MSC address the subscriber is currently roaming on, the SGSN address, or both. The HLR 113 may also return a failure, if it considers the destination to be unavailable for short messaging.

Having obtained the routing information from the HLR 113, the GMSC 121 will attempt to deliver the Short Message 201 to its recipient. This is done by invoking the MAP_MT_FORWARD_SHORT_MESSAGE service, which sends a MAP mt-ForwardSM message 204 to the address returned by the HLR 113, regardless of whether it is an MSC (Circuit Switched SMS delivery) or an SGSN (Packet Switched SMS delivery) 111.

The VMSC 111 will request the information needed for it to deliver the Short Message 201 to its recipient by sending a Send_Info_for_MT_SMS message 205 to the VLR 112. The VLR 112 will then instigate a page request, or subscriber search, for the destination subscribers Mobile Subscriber ISDN Number (MSISDN) and return the result 206 to the VMSC 111. Since a typical deployment sees the VLR 112 being co-located with the MSC 111, this message flow is usually internal to the platform. Should the page or search for the subscriber fail, the VLR 112 will indicate the failure cause to the VMSC 111, which will abort the Short Message delivery procedure and return the failure to the SMSC 111. If the page of the handset 110 was successful and Short Message delivery 207 was sent and Delivery Ack 208 from handset 110 received, the VMSC 111 will then send to the SMSC indicating successful delivery 209. The GMSC 121 component of the SMSC 120 passes the result 210 of the delivery attempt to the Service Center 122. In the case of successful delivery, the delivered text message will be removed from the Store and Forward Engine (SFE) and, if requested, a delivery report sent to the text originator. If the delivery failed, the SMSC 120 invokes a retry procedure to periodically make further attempts at delivery; additionally, it may register with the HLR 113 to receive a notification when the B-Party becomes available for Short Message delivery in the future.

Figure 3:
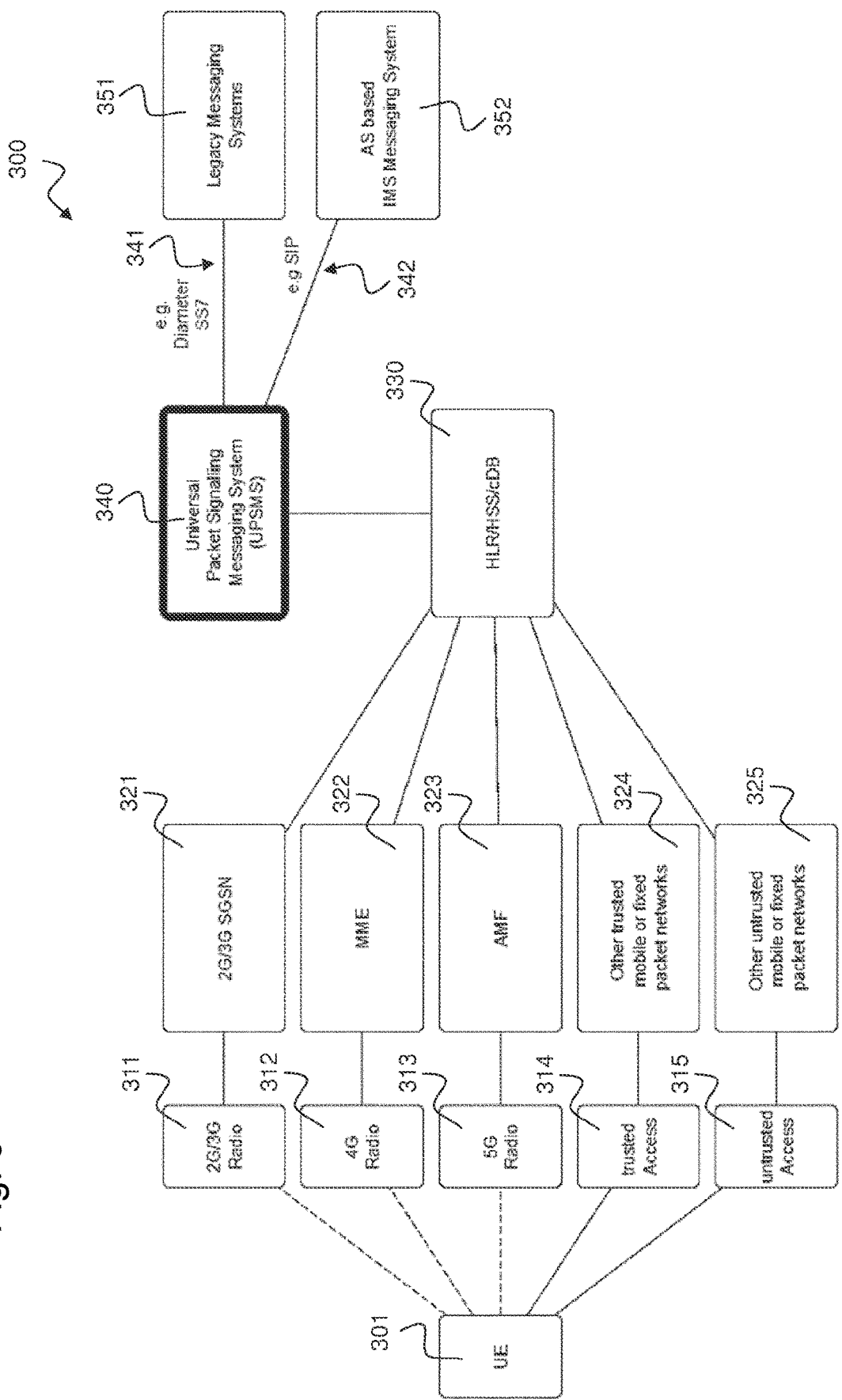
FIG. 3 shows a block diagram of an exemplary communication system 300 including Universal Packet Signaling Messaging System (UPSMS) 340 according to the disclosure.

FIG. 3 shows a block diagram of an exemplary communication system 300 including Universal Packet Signaling Messaging System (UPSMS) 340 according to the disclosure.

The user equipment (UE) 301 is connected to one or more access networks, e.g. a 2G/3G Radio network 311, a 4G Radio network 312, a 5G Radio network 313, a trusted access network 314 or an untrusted access network 315. The access networks are connected to respective core network nodes. The 2G/3G Radio network 311 is connected to a 2G/3G SGSN (Serving GPRS Support Node) node 321. The 4G Radio network 312 is connected to a MME (Mobile Management Entity) node 322. The 5G Radio network 313 is connected to an AMF (Access Management Function) 323. The trusted access network 314 is coupled to other trusted mobile or fixed packet core networks 324. The untrusted access network 315 is coupled to other untrusted mobile or fixed packet core networks 325. Each of the core network nodes 321, 322, 323, 324, 325 is connected to a HLR (Home Location Register)/HSS (Home Subscription Server)/cDB (common data base) 330, also denoted hereinafter as subscription and location server 330. The subscription and location server 330 is connected to the Universal Packet Signaling Messaging System (UPSMS) 340. UPSMS 340 is connected to legacy messaging systems 351 via interface 341, e.g. using Diameter or SS7. UPSMS 340 may be further connected to AS based IMS Messaging System 352 via interface 342, e.g. using SIP (Session Initiation Protocol).

The UE (User Equipment) block 301 represents the user equipment or client terminal or mobile communication device which can be operated by the subscriber to initiate communication in the network, i.e. starting a communication (mobile originating, MO) or accepting (mobile terminating, MT). The UE 301 can also initiate communication without user interaction, e.g. it can be a machine terminal, e.g. for a car or a robot or other device.

The radio access network nodes 311, 312, 313, 314, 315 represent the (radio) access network by which the UE 301 obtains access to the communication network. The interface between UE 301 and radio access network nodes 311, 312, 313, 314, 315 is either an air interface when the access network is a wireless network or wired when the access network is a wired network.

The Access and Mobility Management Function (AMF) node 323 represents the access and mobility management function. It manages the access and mobility functions of the UE 301. The AMF 323 may also include network slice selection functionality. For wireless access, mobility management is not needed.

The MME node 322 is the key control-node for the LTE access-network. It is responsible for idle mode UE (User Equipment) paging and tagging procedure including retransmissions. It is involved in the bearer activation/deactivation process and is also responsible for choosing the SGW for a UE at the initial attach and at time of intra-LTE handover involving Core Network (CN) node relocation.

In the following, an exemplary functionality of the communication system 300 is described. The communication system 300 comprises one or more messaging systems 351, 352 for delivering messages based on a respective message signaling protocol, e.g. a legacy messaging system 351 delivering messages according to the SS7 signaling protocol or according to a Diameter protocol 341 and/or an Application Server (AS) based IMS (IP Multimedia Subsystem) messaging system 352 delivering messages according to a SIP (Session Initiation Protocol) protocol 342. The communication system 300 comprises one or more packet core networks, wherein each packet core network is designed according to a respective packet core network technology, e.g. 2G/3G packet core network technology including 2G/3G radio 311 and 2G/3G SGSN 321, or e.g. 4G packet core network technology including 4G radio 312 and MME 322, or e.g. 5G packet core network technology including 5G radio 313 and AMF 323, or e.g. other packet core network technology. The communication system 300 comprises a subscription and location server 330, configured to store for each subscriber of a plurality of subscribers associated with a corresponding user equipment (UE): a subscriber identity; a subscriber location indicating in which packet core network of the plurality of packet core networks the subscriber is located; and an indication that a Universal Packet Signaling Messaging System (UPSMS) service is supported. The communication system 300 comprises a UPSMS system 340, configured to extend a message received from one of the messaging systems 351, 352 based on a message signaling protocol extension that extends the message signaling protocol by including an indication that UPSMS is supported, and to forward the extended message to the subscription and location server 330. The subscription and location server 330 is configured to authenticate a subscriber based on the subscriber identity, and to identify for an authenticated subscriber, for whom the UPSMS service is supported, a packet core network of the plurality of packet core networks that is connected to the corresponding UE 301, based on the subscriber identity, and to deliver the extended message via the identified packet core network to the corresponding UE 301.

The message signaling protocol extension may be based on control plane signaling. The message signaling protocol extension may be configured to add the indication that the UPSMS service is supported to the message received from one of the messaging systems and to encapsulate the message with the indication in the extended message. A format of the extended message is unified for the plurality of messaging systems.

The subscription and location server 330 may be configured to deliver the extended message via control plane to the corresponding UE. The message signaling protocol extension may be based on a Diameter signaling protocol 341 or a service-based interface.

The subscription and location server 330 may be configured to deliver the message via one of the following packet core networks to the UE 301: 2G/3G packet core network using SGSN 321, 4G packet core network using MME 322, 5G packet core network using AMF 323, trusted mobile or fixed packet core network, untrusted mobile or fixed packet core network, WLAN packet core network.

The subscription and location server 330 may be a home subscription and location server of a roaming user of the UE 301.

The UPSMS system 340 may be configured to provide firewall functionality to block a message based on a transport protocol of the message and an application protocol of the message.

The subscription and location server 330 may be configured to determine a location of the UE 301 based on a paging functionality of the plurality of packet core networks, in particular based on a paging functionality of the packet core network of the plurality of packet core networks that is connected to the UE 301.

The message content may be amongst others e.g. one of the following message types: SMS, IP-based packet, unstructured data message, Over-the-Air (OTA) message e.g. for UE configuration purpose, public warning message (PWS).

The UPSMS system 340 may be configured to: receive a message comprising a UE identifier of the UE; determine the subscription and location server associated with the UE based on the UE identifier; transmit a request to the subscription and location server requesting for an indication if UPSMS is supported for the UE, wherein the request message comprises the UE identifier; and forward the message to the subscription and location server responsive to an indication that UPSMS is supported for the UE.

The subscription and location server 330 may be configured to: receive, from the UPSMS system (as provisioned to the subscription of the user), a request requesting for an indication if UPSMS is supported for the UE, wherein the request comprises a UE identifier of the UE; determine, based on the UE identifier, a subscription entry associated with the UE; retrieve, from the subscription entry, an indication indicating if UPSMS is supported for the UE and a packet core network identifier of the packet core network of the plurality of packet core networks that is connected to the UE; transmit, to the UPSMS system, a response to the request, the response comprising the retrieved indication;

and forward the extended message from the UPSMS system to the packet core network corresponding to the retrieved packet core network identifier.

Each of the packet core networks comprises a packet core network entity that is configured to: receive, from the UE, a registration request comprising a UE identifier of the UE and a request for a UPSMS subscription; register the UE for access to the corresponding packet core network based on the UE identifier and for a support of UPSMS; and transmit a registration message to the subscription and location server associated with the UE, wherein the registration message comprises the UE identifier of the UE and an indication that UPSMS is supported for the UE.

The UE 301 may be configured to: transmit a registration request comprising the UE identifier of the UE and a request for a UPSMS subscription to the packet core network of the plurality of packet core networks that is connected to the UE; and transmit a message to the corresponding packet core network.

The communication system 300 can deliver a short message, e.g. a terminating SMS, to a UE 301 without combined attach to a 2G/3G network and without the capability to receive IMS based messages. The device 301 may have a packet only attach to an e.g. 4G or 5G network 312, 313. The UPSMS 340 is able to deliver such a SMS message (or any other short message) together with the correlating HSS 330 and 4G/5G network 312, 313 to a UE 301 which is attached to a packet access (e.g. 4G, 5G). The HSS 330 knows the related packet core node (e.g. MME 322 or AMF 323) in charge of serving the UE 301 and querying the UE location area. The MME 322 or AMF 323 uses network evolution native methods to page or locate the receiving UE 301. This efficient method doesn't require an establishment of a payload bearer and deployment of legacy core equipment is not necessary. In this disclosure a short message may be defined as a message with a limited number of bytes, e.g. between 150 bytes and 1500 bytes. Exemplary implementations of the UPSMS 340 and the subscription and location server 330 are described below with respect to FIGS. 6 and 7.

The communication system 300 with UPSMS 340 and subscription and location server 330 introduces new communication methods that allow operators to deliver secure and much more efficient all kind of small messages (e.g. SMS, IP based messaging, unstructured messages, OTA, public warning messages), using unified protocol extensions (e.g. Diameter extensions or Service Based Interface extensions), to a UE 301 connected to a packet core network (e.g. 4G, 5G, WLAN). Any kind of messages like OTA (over the air device configuration messages), unstructured messages (e.g. USSD), BLOB (Binary large objects), SMS, etc. are supported. There is no need to deploy an IMS core network to enable the required SMS routing, e.g. for SMS delivery and sending the legacy nodes like e.g. GMSC or for new generation networks. The new unified signaling (e.g. Diameter extensions or Service Based Interface extensions) can support secure connection between an UE and/or between the packet core network elements (e.g. MME or AMF). Separate message transfer via control plane to the UE avoids payload traffic for messaging. This enables message transfer in scenarios for UEs with signaling only packet core network attach/access. A further advantage is, that the routing logic is independent from network/messaging platform and only uses the packet core network native routing and paging functions. This enables also interconnection for messaging services between operators with different network protocols/technologies in place e.g. SS7 and Diameter. The communication network 300 offers a central point for implementing a firewall for messaging which is able to correlate different transport protocols and applications.

The communication system 300 illustrated in FIG. 3 provides the following advantages: A new network-based function to collect store, receive and forward messages (e.g. SMS, IP based messaging, unstructured messages, OTA messages, public warning messages). The communication system 300 provides new signaling between HSS to 4G or 5G or generic packet core (e.g. MME, AMF) which enables to send routing, delivery information and transparent message content together. The communication system 300 provides a new DIAMETER based signaling design that allows unified transport of the content and delivery parameters from/to the HSS. The communication system 300 provides HSS extension to receive/transmit a new message request/response from UPSMS. The communication system 300 provides HSS extension to add the addresses of the packet core node where the terminating UE is located (e.g. MME or AMF) and construct a new message which is used to deliver the message content to the related packet core node (e.g. to MME or AMF). The communication system 300 provides encryption of the signaling link and/or message parts. The communication system 300 provides an indicator to signal for HSS to the packet core that universal packet control messaging is supported for a subscriber. The communication system 300 provides UE originated messages via the UPSMS. The communication system 300 provides transparent and non-transparent (cached/retried) delivery of messages for legacy messaging platforms as gateway. The communication system 300 provides "Forced" manufacture, operator or government organisation messages—independent from service subscription or exhausted data balances. The communication system 300 provides special charging for all types of messages transported via this new signaling. The communication system 300 provides common firewall function on protocol and application layer. The communication system 300 further provides standardized messages in future releases between DB and Network for message handling e.g.: Common paging and search function independent of access technology and location of the UE; Deliver message (attempt); Delivery status message (delivered, failed . . . ); Delivery processing state (pending, execution, implementation, upgrade, failed . . . ); Receive message; Receive status message; Receive processing state; Exchange service state (bidirectional).

Figure 4:
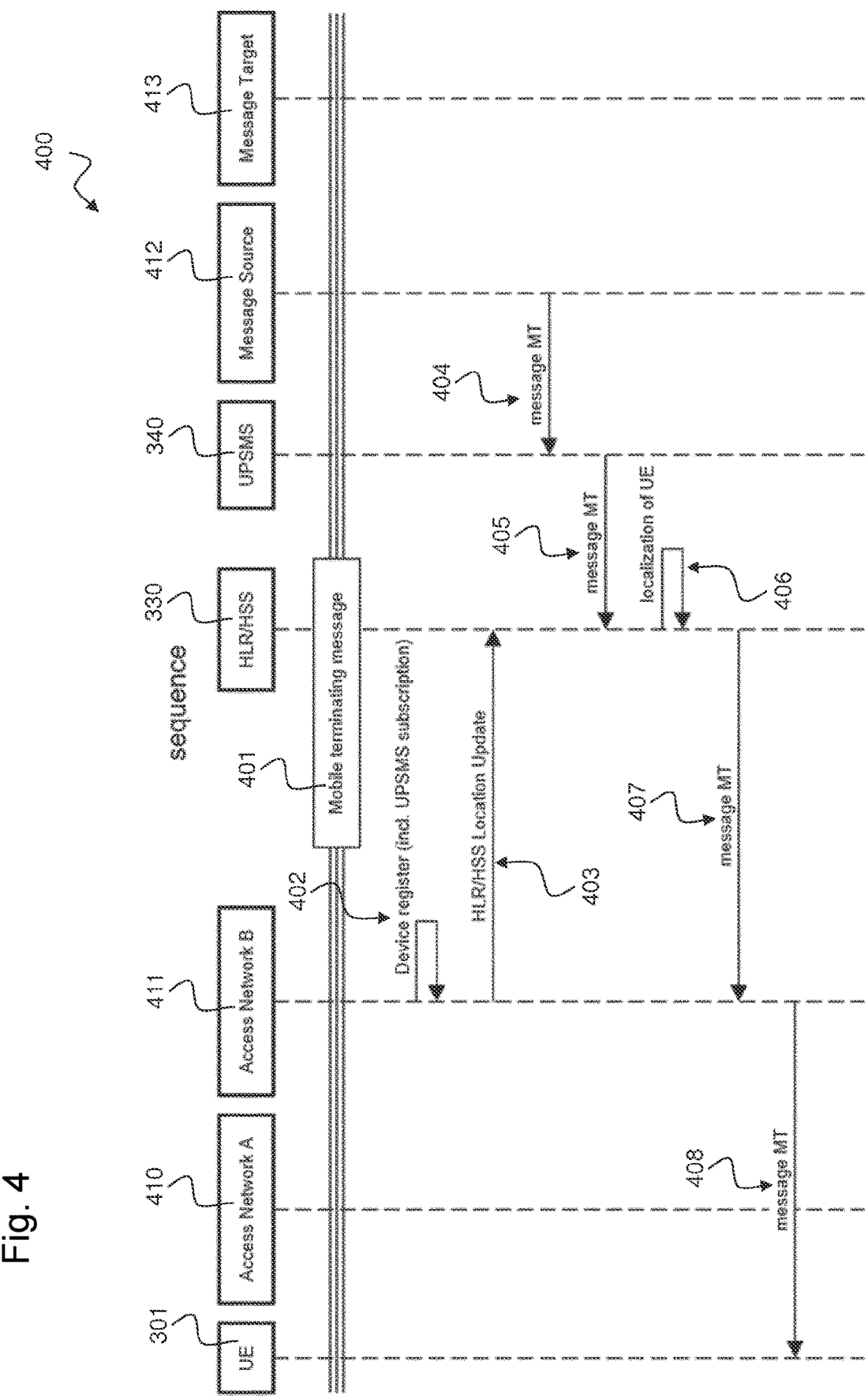
FIG. 4 shows a message sequence diagram 400 illustrating an exemplary mobile terminating (MT) message transfer for short messages based on a UPSMS 340 functionality according to the disclosure.

FIG. 4 shows a message sequence diagram 400 illustrating an exemplary mobile terminating (MT) message transfer for short messages based on UPSMS 340 functionality according to the disclosure.

FIG. 4 illustrates message transfer of a mobile terminating message 401 from a message source 412, e.g. a SMS service center as described above with respect to FIG. 2 or an IMS application server, to a corresponding UE 301. The message transfer is provided in a communication system 300 as described above with respect to FIG. 3. The main components UE 301, Access Network A 410, Access Network B 411, HLR/HSS 330, UPSMS 340, message source 412 and message target 413 are shown.

In the beginning, device registers 402 at access network B 411, e.g. one of the packet access networks 311, 321, 312, 322, 313, 323, 314, 324, 315, 325 depicted in FIG. 3. Device registrations includes UPSMS subscription, i.e. subscription of the UE for the UPSMS service in the HLR/HSS (i.e. subscription and location server 330). Then, access network B 411 transmits HLR/HSS location update message to HLR/HSS 330 (i.e. subscription and location server 330) to inform HLR/HSS 330 about the current location of the UE

301. When message source 412 transmits message MT (mobile terminated) 404 to UPSMS 330, UPSMS 330 transmits message MT 405 to HLR/HSS 330 which performs localization of the corresponding UE 301 to request for access network B 411 to which UE 301 is connected and transmits message MT 407 to access network B 411. Access network B 411 forwards message MT 408 to UE 301. Localization of the corresponding UE 301 may be performed according to the description with respect to FIGS. 6 and 7.

Figure 5:
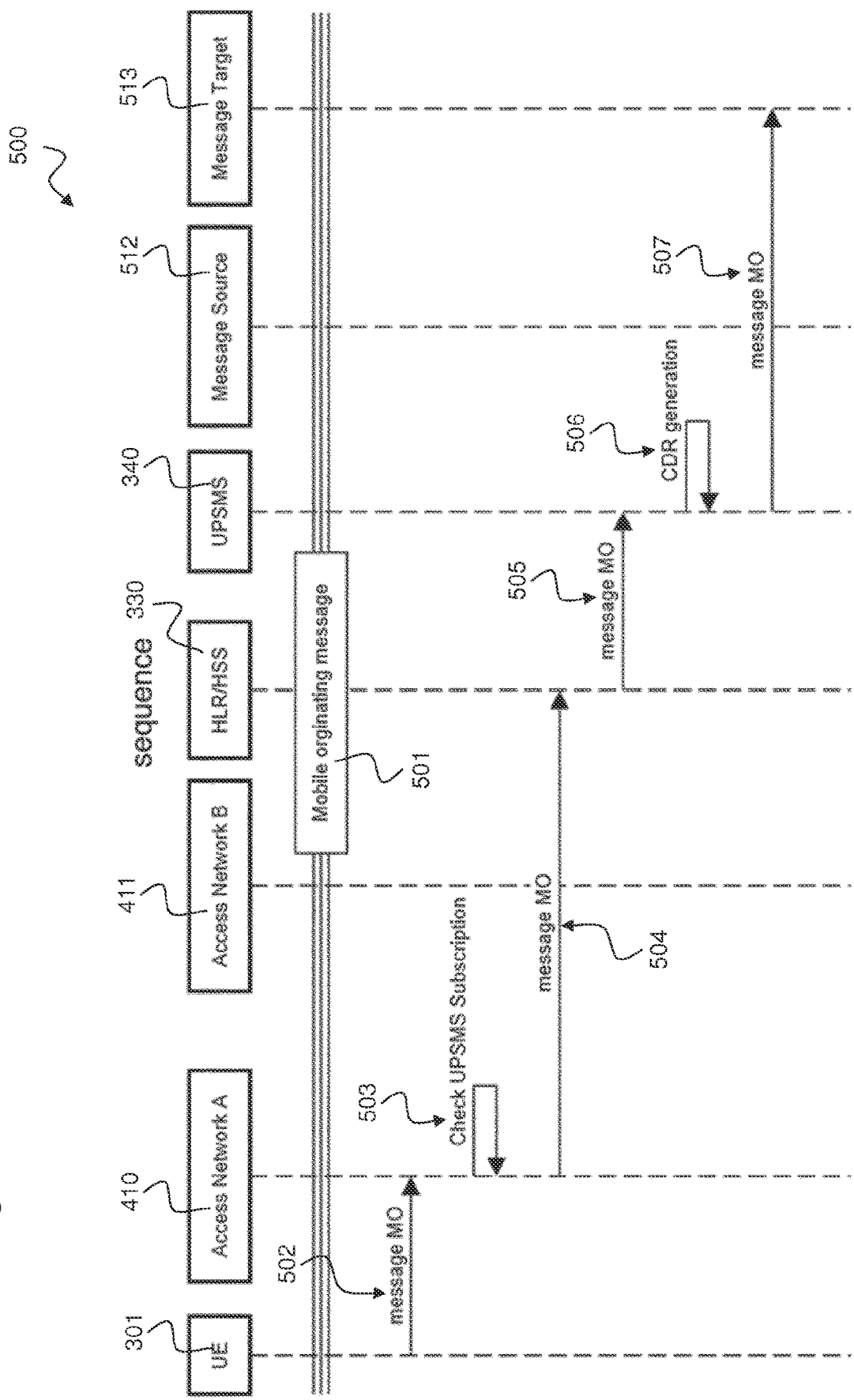
FIG. 5 shows a message sequence diagram 500 illustrating an exemplary mobile originating (MO) message transfer for short messages based on a UPSMS 340 functionality according to the disclosure.

FIG. 5 shows a message sequence diagram 500 illustrating an exemplary mobile originating (MO) message transfer for short messages based on UPSMS 340 functionality according to the disclosure.

FIG. 5 illustrates message transfer of a mobile originating message 501 from the UE 301 to a message target 413, e.g. an SMS service center as described above with respect to FIG. 2 or an IMS application server. The message transfer is provided in a communication system 300 as described above with respect to FIG. 3. The main components UE 301, Access Network A 410, Access Network B 411, HLR/HSS 330, UPSMS 340, message source 412 and message target 413 are shown.

UE 301 transmits message MO (mobile originating) 502 to access network A 410 to which UE 301 is connected. Access network A 410 checks UPSMS subscription 503 and forwards message MO 504 to HLR/HSS 330 (i.e. subscription and location server 330) if the UE is subscribed to the UPSMS service. If a UE 301 is subscribed to the UPSMS service, the message MO can be directly forwarded to the subscription and location server 330, denoted herein as HLR/HSS 330. HLR/HSS 330 forwards message MO 505 to UPSMS 340 which performs CDR (call data record) generation 506. The CDR may generate a new entry in the UPSMS, e.g. including subscriber ID, location of UE and UPSMS support as described below with respect to FIG. 7. Then UPSMS 340 forwards message MO 507 to message target 513.

Figure 6:
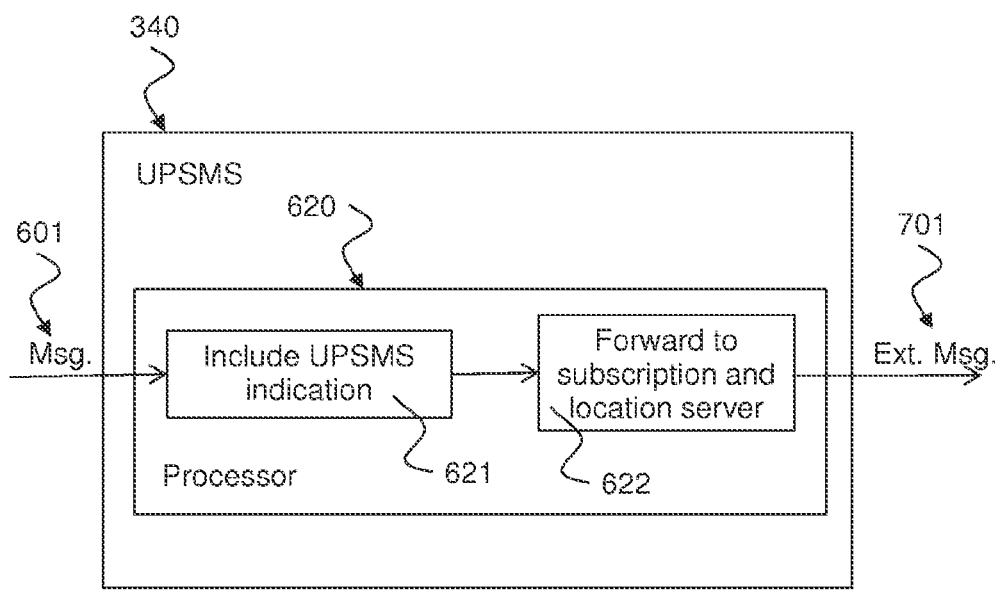
FIG. 6 shows a block diagram of an exemplary UPSMS 340 according to the disclosure.

FIG. 6 shows a block diagram of an exemplary UPSMS 340 according to the disclosure.

The UPSMS 340 includes a processor 620 for processing a message 601 received from an input interface to an extended message 701 provided at an output interface. The message 601 may be received from a messaging system such as a legacy messaging system 351 or an AS based IMS messaging system 352 as shown in FIG. 3. The message may be for example an SMS, an IP-based packet, an unstructured data message, an Over-the-Air (OTA) message, e.g. for UE configuration purpose, or a public warning message (PWS). The processor 620 extends the message by including an UPSMS indication into the message, thereby generating the extended message 701. The UPSMS indication indicates that the UPSMS service is provided for the message 601, i.e. that the message 601 may be directly forwarded to the subscription and location server 330 which knows the correct routing (i.e. the packet core network of the corresponding UE) for the message. The processor 620 further includes a forwarding logic 622 for forwarding the extended message 701 to the subscription and location server 330. For example, the forwarding logic 622 includes the address of the subscription and location server 330 or a route to the subscription and location server 330 into the message 601 in order to correctly transmit the extended message 701 to the subscription and location server 330.

In an exemplary implementation, the UPSMS system 340 receives a message 601 comprising a UE identifier of the UE 301. The UPSMS 340 determines the subscription and location server 330 associated with the UE 301 based on the UE identifier. The UPSMS 340 transmits a request to the subscription and location server 330 requesting for an indication if UPSMS is supported for the UE 301, wherein the request message comprises the UE identifier. The UPSMS 340 generates the extended message 701 and forwards the extended message 701 to the subscription and location server 330 responsive to an indication that UPSMS is supported for the UE 301.

A further functionality of the UPSMS 340 is to temporarily store and re-transmit messages such as the message 601 or the extended message 701, e.g. in the case of non-transmitted or erroneously transmitted messages or of temporarily non-reachable user terminal 301.

Figure 7:
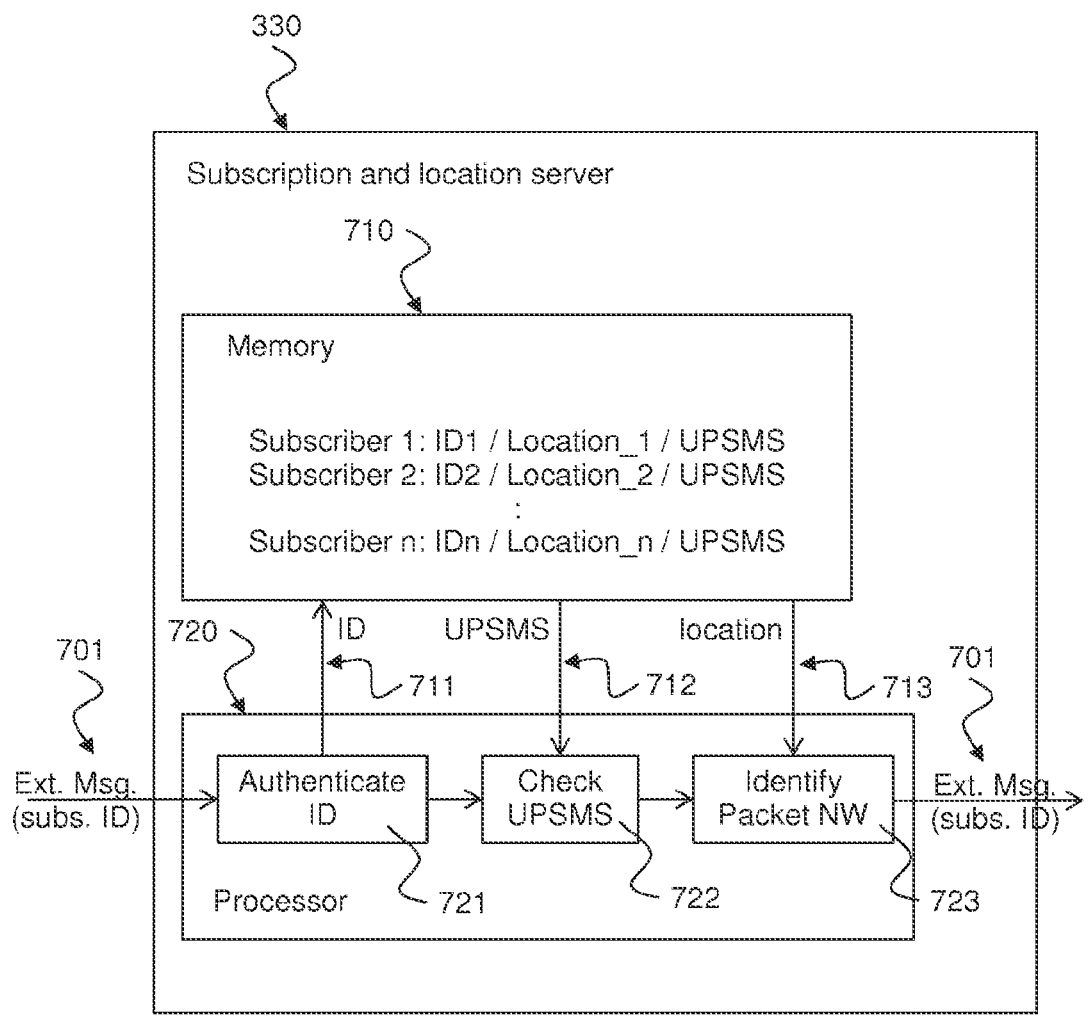
FIG. 7 shows a block diagram of an exemplary subscription and location server 330 according to the disclosure.

FIG. 7 shows a block diagram of an exemplary subscription and location server 330 according to the disclosure.

The subscription and location server 330 includes a memory 710 for storing for each subscriber of a plurality of subscribers associated with a corresponding UE: a subscriber identity (ID1, ID2, . . . , IDn); a subscriber location (Location_1, Location_2, . . . , Location_n) indicating in which packet core network of the plurality of packet core networks the subscriber is located; and an indication that a Universal Packet Signaling Messaging System (UPSMS) service is supported.

The subscription and location server 330 receives an extended message 701, e.g. as generated by the UPSMS 340 described above with respect to FIG. 6.

The subscription and location server 330 includes a processor 720 including authentication logic 721, checking logic 722 and identifying logic 723. The authentication logic 721 is configured to authenticate a subscriber based on the subscriber identity 711. I.e., the authentication logic 721 looks up the subscriber identity 711 received with the extended message 701 in the memory 710. If an entry exists in the memory 710 with the subscriber identity 711, the respective subscriber is authenticated. The checking logic 722 is configured to check for an authenticated subscriber in the memory 710, if the UPSMS service is supported for that subscriber. The identifying logic 723 identifies for an authenticated subscriber, for whom the UPSMS service is supported, a packet core network of the plurality of packet core networks that is connected to the corresponding UE 301 by looking up the location of the respective subscriber in the memory 710. Then the subscription and location server 330 delivers the extended message 701 via the identified packet core network to the corresponding UE 301.

In an exemplary implementation, the subscription and location server 330 is configured to: receive, from the UPSMS system 340 as provisioned to the subscription of the user, a request requesting for an indication if UPSMS is supported for the UE 301, wherein the request comprises a UE identifier of the UE 301; determine, based on the UE identifier, a subscription entry associated with the UE 301; retrieve, from the subscription entry, an indication indicating if UPSMS is supported for the UE 301 and a packet core network identifier of the packet core network of the plurality of packet core networks that is connected to the UE 301; transmit, to the UPSMS system 340, a response to the request, the response comprising the retrieved indication; and forward the extended message 701 from the UPSMS system 340 to the packet core network corresponding to the retrieved packet core network identifier.

Figure 8:
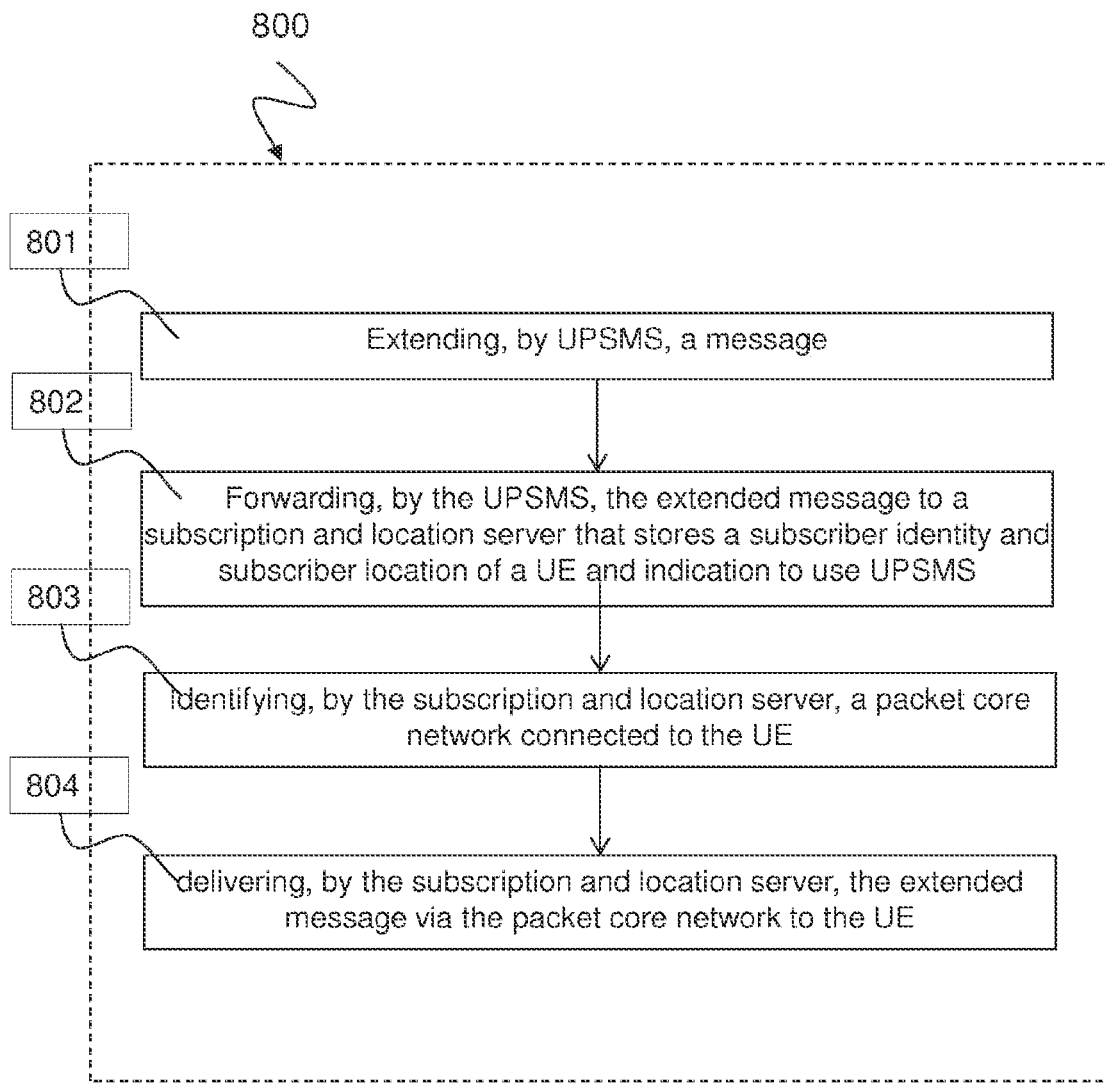
FIG. 8 shows a schematic diagram illustrating an exemplary method 800 for short message transfer according to the disclosure.

FIG. 8 shows a schematic diagram illustrating an exemplary method 800 for short message transfer according to the disclosure.

The method 800 can be used for transmitting a message in a communication system 300 comprising a plurality of messaging systems 351, 352 for delivering messages based on a respective message signaling protocol 341, 342; a plurality of packet core networks 311, 321, 312, 322, 313, 323, 314, 324, 315, 325, wherein each packet core network is designed according to a respective packet core network technology; a subscription and location server 330 for storing for each subscriber of a plurality of subscribers associated with a corresponding user equipment, UE 301: a subscriber identity; a subscriber location indicating in which packet core network of the plurality of packet core networks the subscriber is located; and an indication that a Universal Packet Signaling Messaging System (UPSMS) service is supported; and a Universal Packet Signaling Messaging System (UPSMS) 340, e.g. as described above with respect to FIG. 3.

The method 800 comprises extending 801, by the UPSMS system 340, a message received from one of the messaging systems 351, 352 based on a message signaling protocol extension which extends the message signaling protocol by including an indication that UPSMS is supported, e.g. as described above with respect to FIG. 6.

The method 800 comprises forwarding 802, by the UPSMS system 340, the extended message to the subscription and location server 330, e.g. as described above with respect to FIG. 6.

The method 800 comprises identifying 803, by the subscription and location server 340, for an authenticated subscriber, for whom the UPSMS service is supported, a packet core network of the plurality of packet core networks that is connected to the corresponding UE, based on the subscriber identity, e.g. as described above with respect to FIG. 7.

The method 800 comprises delivering 804, by the subscription and location server 340, the extended message via the identified packet core network to the corresponding UE, e.g. as described above with respect to FIG. 7.

Another aspect of the invention is related to a computer program product comprising program code for performing the methods and procedures or the functionalities described above, when executed on a computer or a processor. The method may be implemented as program code that may be stored on a non-transitory computer medium. The computer program product may implement the techniques described above.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although exemplary aspects have been illustrated and described herein, it will be appreciated by those of ordinary skill in the art that a variety of alternate and/or equivalent implementations may be substituted for the exemplary aspects shown and described without departing from the scope of the present disclosure. This application is intended to cover any adaptations or variations of the exemplary aspects discussed herein.

Although the elements in the following claims are recited in a particular sequence, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more exemplary embodiments, those skilled in the art recognize that many changes may be made thereto without departing from the scope of the present invention. It is therefore to be understood that within the scope of the appended claims and their equivalents, the invention may be practiced otherwise than as specifically described herein.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A communication system, comprising:
a plurality of messaging systems for delivering messages based on a respective message signaling protocol;
a plurality of packet core networks, wherein each packet core network corresponds to a respective packet core network technology;
a subscription and location server configured to store for each subscriber of a plurality of subscribers associated with a corresponding user equipment (UE):
a subscriber identity;
a subscriber location indicating in which packet core network of the plurality of packet core networks the subscriber is located; and an indication that a Universal Packet Signaling Messaging System (UPSMS) service is supported; and a UPSMS system configured to extend a message received from one of the messaging systems based on a message signaling protocol extension that extends the message signaling protocol by including an indication that the UPSMS service is supported for a respective subscriber, and to forward the extended message to the subscription and location server;

wherein the subscription and location server is configured to authenticate a subscriber based on the subscriber identity, and to identify for an authenticated subscriber, for whom the UPSMS service is supported, a packet core network of the plurality of packet core networks that is connected to the corresponding UE, based on the subscriber identity, and to deliver the extended message via the identified packet core network to the corresponding UE.

2. The communication system of claim 1, wherein the message signaling protocol extension is based on control plane signaling.

3. The communication system of claim 1, wherein the message signaling protocol extension is configured to add the indication that the UPSMS service is supported to the message received from one of the messaging systems and to encapsulate the message with the indication in the extended message, wherein a format of the extended message is unified for the plurality of messaging systems.

4. The communication system of claim 1, wherein the subscription and location server is configured to deliver the extended message via a control plane to the corresponding UE.

5. The communication system of claim 1, wherein the message signaling protocol extension is based on a Diameter signaling protocol or a session initiation protocol.

6. The communication system of claim 1, wherein the subscription and location server is configured to deliver the message via one of the following packet core networks to the UE:

a 2G/3G packet core network using a Serving GPRS Support Node (SGSN);

a 4G packet core network using a Mobility Management Entity (MME);

a 5G packet core network using an Access and Mobility Management Function (AMF);

a trusted mobile or fixed packet core network;

an untrusted mobile or fixed packet core network; or a wireless local area network (WLAN) packet core network using a packet core network specific control element.

7. The communication system of claim 1, wherein the subscription and location server is a home subscription and location server of a roaming user of the UE.

8. The communication system of claim 1, wherein the UPSMS system is configured to provide firewall functionality to block a message based on a transport protocol of the message and an application protocol of the message.

9. The communication system of claim 1, wherein the subscription and location server is configured to determine a location of the UE based on a paging functionality of the packet core network of the plurality of packet core networks that is connected to the UE.

10. The communication system of claim 1, wherein the message is at least one of the following message types:

a Short Message Service (SMS);

an IP-based packet;

an unstructured data message;

an Over-the-Air (OTA) message; or a public warning message (PWS).

11. The communication system of claim 1, wherein the UPSMS system is configured to:

receive a message comprising a UE identifier of the UE;

determine the subscription and location server associated with the UE based on the UE identifier;

transmit a request to the subscription and location server requesting for an indication of whether the UPSMS service is supported for the UE, wherein the request message comprises the UE identifier; and forward the message to the subscription and location server responsive to an indication that the UPSMS service is supported for the UE.

12. The communication system of claim 1, wherein the subscription and location server is configured to:

receive from the UPSMS system a request requesting for an indication of whether the UPSMS service is supported for the UE, wherein the request comprises a UE identifier of the UE;

determine, based on the UE identifier, a subscription entry associated with the UE;

retrieve, from the subscription entry, an indication indicating whether the UPSMS service is supported for the UE and a packet core network identifier of the packet core network of the plurality of packet core networks that is connected to the UE; and transmit, to the UPSMS system, a response to the request, the response comprising the retrieved indication.

13. The communication system of claim 1, wherein each of the packet core networks comprises a packet core network entity that is configured to:

receive, from the UE, a registration request comprising a UE identifier of the UE and a request for a UPSMS subscription;

register the UE for access to the corresponding packet core network based on the UE identifier and for support of the UPSMS service; and transmit a registration message to the subscription and location server associated with the UE, wherein the registration message comprises the UE identifier of the UE and an indication that the UPSMS service is supported for the UE.

14. The communication system of claim 1, comprising the UE, wherein the UE is configured to:

transmit a registration request comprising the UE identifier of the UE and a request for a UPSMS subscription to the packet core network of the plurality of packet core networks that is connected to the UE; and transmit a message to the corresponding packet core network.

15. A method for transmitting a message in a communication system comprising a plurality of messaging systems for delivering messages based on a respective message signaling protocol; a plurality of packet core networks, wherein each packet core network corresponds to a respective packet core network technology; a subscription and location server for storing for each subscriber of a plurality of subscribers associated with a corresponding user equipment (UE): a subscriber identity; a subscriber location indicating in which packet core network of the plurality of packet core networks the subscriber is located; and an indication that a Universal Packet Signaling Messaging System (UPSMS) service is supported; and a UPSMS system, the method comprising:
- extending, by the UPSMS system, a message received from one of the messaging systems based on a message signaling protocol extension which extends the message signaling protocol by including an indication that the UPSMS service is supported for a respective subscriber;
- forwarding, by the UPSMS system, the extended message to the subscription and location server;
- identifying, by the subscription and location server, for an authenticated subscriber, for whom the UPSMS service is supported, a packet core network of the plurality of packet core networks that is connected to the corresponding UE, based on the subscriber identity; and
- delivering, by the subscription and location server, the extended message via the identified packet core network to the corresponding UE.

* * * * *